Aug. 19, 1958 R. J. CLARCQ, JR., ET AL 2,848,363
METHOD AND APPARATUS FOR HARDENING GEARS AND THE LIKE
Filed March 31, 1955 7 Sheets-Sheet 1

INVENTORS
RICHARD J. CLARCQ, JR.
EARL D. DAMMERT
CARL E. ERNST
EDWARD C. VAN BEERS

BY Richard W. Treverton
ATTORNEY

United States Patent Office 2,848,363
Patented Aug. 19, 1958

2,848,363

METHOD AND APPARATUS FOR HARDENING GEARS AND THE LIKE

Richard J. Clarcq, Jr., Rochester, Earl D. Dammert, Penfield, and Carl E. Ernst and Edward C. Van Beers, Brighton, N. Y., assignors to The Gleason Works, Rochester, N. Y., a corporation of New York Application March 31, 1955, Serial No. 498,325

21 Claims. (Cl. 148—21.56)

The present invention relates to a method of hardening gears and the like toothed members made of steel and other materials that are hardenable by heating followed by quenching, and to a machine or other apparatus for carrying out the method.

It is desirable to harden only the working surfaces of the teeth, leaving the core of the gear in a soft condition, and for this reason it is usual to heat and quench one tooth at a time, rather than the entire gear. However when dealing with certain types of gears, especially those having very narrow bottom lands, it has heretofore been practically impossible to heat one tooth without also heating an adjacent tooth, which has previously been hardened, to such degree as to draw its hardness. By the method and apparatus of the present invention a burner is employed which directs flame against the opposite sides of one tooth at a time, and simultaneously directs a coolant gas, preferably air, against the adjacent sides of the two adjacent teeth. It has been found that in this way the two adjacent teeth can be protected against objectionable heating.

The burner itself has a pair of tongues which extend into adjacent tooth spaces of the workpiece, each tongue having a series of openings for directing flame against the opposite sides of one tooth and another series of openings for directing the coolant gas against the adjacent sides of the adjacent tooth. The tongues contact, or nearly contact, said adjacent sides to maintain a zone of coolant gas near the roots of the adjacent teeth, but they are substantially spaced from the tooth being heated to provide space for the flow of the hot gases of combustion.

Each tooth after being heated is quenched, preferably by indexing of the workpiece to bring the heated tooth into a tank of quenching liquid and simultaneously to bring another tooth into position for heating. The machine includes an indexing mechanism and a means to withdraw the tongues of the burner from engagement with the workpiece just prior to indexing and to reengage it therewith at the conclusion of indexing. The machine further includes a means to reciprocate the burner in a direction axial of the gear during the heating operation for uniformly heating the tooth surfaces.

One type of workpiece required to be heat treated by the new machine is a cup-shaped, internally-toothed, gear. The preferred embodiment of the machine comprises a slide in which is journaled a rotatable or indexable work spindle. A burner support is reciprocable upon the slide parallel to the axis of the spindle to enter and withdraw the burner respectively into and from the open end of the cup-shaped gear. A loader arm is provided for first swinging the workpiece from a loading position into a transfer position in alignment with the work spindle. The slide is then moved forwardly to engage the work spindle with the workpiece, the burner is moved rearwardly into operative relation in the workpiece, and the heat treating operation ensues. Subsequently the slide and the burner are retracted and the arm swings back, returning the workpiece to its original loading position.

The foregoing and other objects and advantages of the invention will appear from the following description made with reference to the drawings, wherein.

Figure 1:
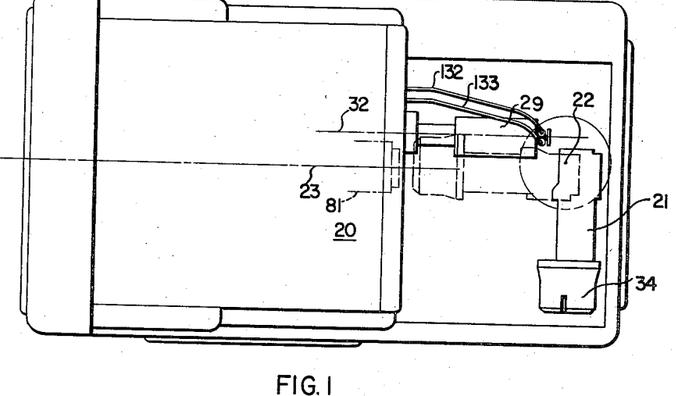
Figs. 1 and 2 are respectively a plan view and a side elevation of the machine, the latter view being partly in section.
Figure 8:
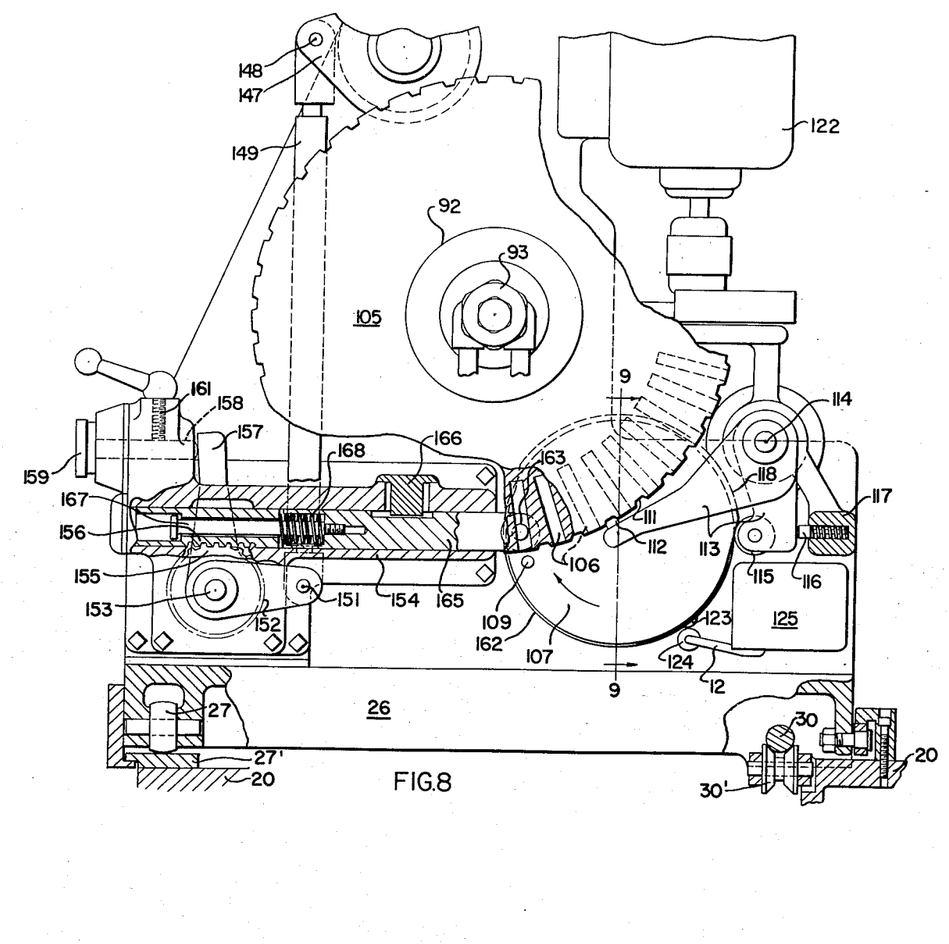
Fig. 8 is an end elevation of the slide shown in Fig. 3, as viewed from the right of Fig. 3.

The illustrated machine comprises a frame 20 supporting a loader arm 21 for angular motion about an upright axis 22 between the full line and broken line positions thereof in Fig. 1. This motion is to carry a workpiece W from a loading position into a position aligned with axis 23 of a work spindle 24, for transfer to the latter, and, subsequently to the heat treating operation, to return the workpiece to the loading position. The work spindle is journaled in anti-friction bearings 25, Fig. 3, in a slide 26 which is reciprocable on the frame in the direction of axis 23. The slide is supported for this motion by a pair of rollers 27, one of which is shown in Fig. 8, rolling on a hardened way 27' on frame 20, and by a guide rod 30 supported on rollers 30', the rod being secured rigidly to the slide and the rollers being mounted on the frame. A burner 28, for heating the internal teeth T of the workpiece which are to be hardened, is carried by a generally C-shaped support 29. This support has a cylindrical portion 31 journaled in the slide 26 for motion along and about an axis 32 which is parallel to work spindle axis 23. Mounted on the frame 20 adjacent the workpiece at the work station is a tank 33 for quenching liquid. The tank is movable between a lowered position clear of the workpiece and a raised position in which the contained liquid immerses some of the teeth T of the workpiece.

Figure 4:
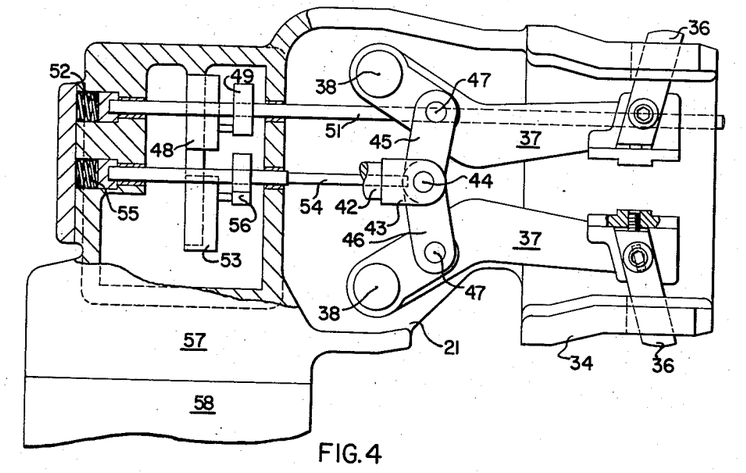
Fig. 4 is a side view of the loader, partly in section in the plane indicated by section line 4—4 of Fig. 5.

Formed on the distal end of loader arm 21 is an arbor 34 for seating the workpiece. Projecting through slots 35 in the arbor are clamp members 36 adapted to extend into opposed tooth spaces of the internal workpiece teeth T for the dual purpose of aligning these teeth with the burner, and, when members 36 are moved apart, to clamp the workpiece to the loader arm. For this purpose the members 36 are secured to clamp arms 37, preferably in such manner that they can be adjusted radially with respect to these clamp arms. The latter are pivoted by pins 38 to the loader arm 21. For actuating the clamp arms an air operated piston 39 is arranged in a cylinder 41 in the loader arm. The piston rod 42 has on its outer end a clevis 43 journaling a pin 44 which constitutes a pivoted connection between the piston and a pair of toggle links 45 and 46. These links are pivoted to the respective clamp arms 37 by pins 47. As shown in Fig. 4 the arbor 34 is C-shaped in cross-section, being open on the side thereof adjacent the burner in order that the burner may enter into the workpiece on the arbor.

A normally open limit switch 48 mounted on the loader arm is operated to its closed position when a workpiece W is positioned on the arbor 34. The switch is closed by an abutment element 49 on a rod 51 that is slidable in the arm. A spring 52 urges the rod to a position wherein its outer end projects slightly beyond the end of the arbor, but a workpiece properly positioned on the arbor moves the rod inwardly, against the resistance of the spring, to cause the abutment 49 to engage and close the switch. A normally closed limit switch 53 also mounted on the loader arm is opened when the piston 39 moves to its limit position to the left (in Figs. 4 and 5) to thereby act through toggle 45, 46 to release clamps 36. As the piston approaches this position the pivot pin 44 engages a rod 54 that is slidable in the loader arm and moves the rod against the resistance of a backing spring 55 to cause an abutment member 56 on the rod to contact the actuating stem of the switch and thereby open the switch.

Figure 2:
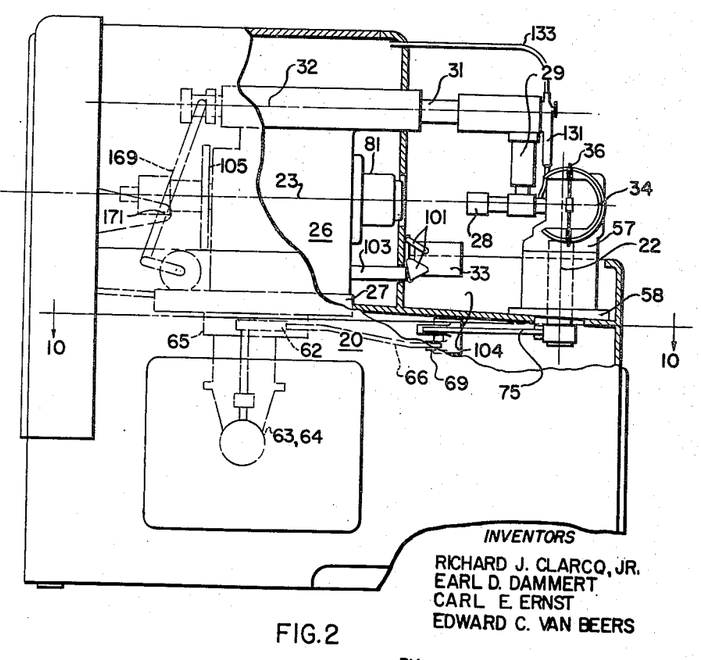
Figure 5:
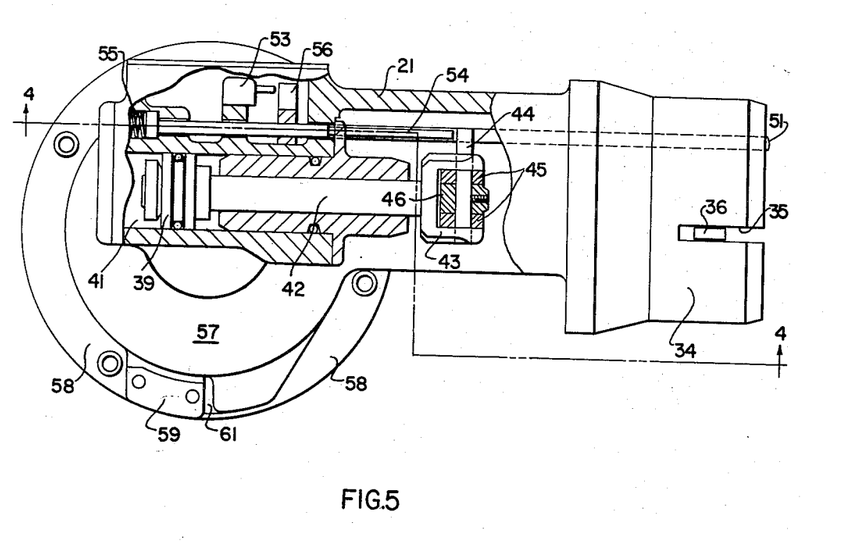
Fig. 5 is a plan view of the loader, with parts thereof broken away and appearing in section.

As shown in Figs. 2 and 5 the loader arm has a hub 57 mounted for rotation about axis 22 on a member 58 that is secured to frame 20. Cooperating stops 59 and 61 respectively on this member and on the hub limit clockwise motion of the arm, in Figs. 1 and 5, to the position wherein a workpiece on arbor 34 is aligned with work spindle axis 23. The swinging motion of the loader arm about axis 22 and also the rectilinear motion of slide 26 is effected by a crank 62, Figs. 2 and 10, that is rotated by a motor 63 through a reduction gear unit 64, there preferably being associated with the motor a brake which is applied whenever the motor is deenergized. The crank is journaled for rotation in a bracket 65 which is rigidly secured to the slide and which also supports the motor and gear reduction unit. A pitman 66 connected to crank pin 67 is pivotally connected by a pin 68 to an arm 69 of a bell crank lever which is fulcrumed by pivot pin 40 to a bracket 50 secured to frame 20. The other arm of the bell crank, designated 60, is pivoted by pin 70 to one end of a pitman 75. The opposite end of this pitman is pivoted by pin 76 to an arm 80 affixed to the lower end of loader arm hub 57.

Figure 10:
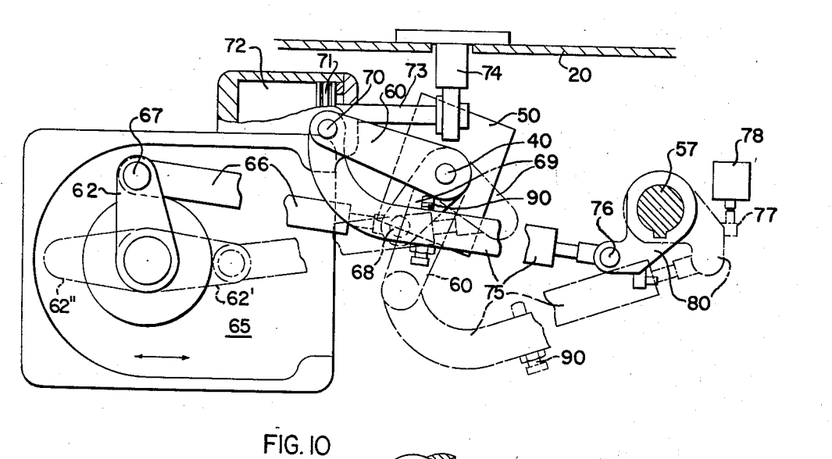
Fig. 10 is a plan view of the slide and loader actuating mechanism, taken approximately in the plane 10—10 of Fig. 2.

Motion of the slide, to the right in Figs. 1, 2 and 10, (to the left in Fig. 3) is resisted by a compressed air biasing means comprising a piston 71 slidable in a cylinder 72 on bracket 65, the piston rod 73 being fixed to the frame 20 by anchoring stud 74. The left chamber of the cylinder (in Fig. 10) is constantly open to a suitable source of compressed air, not shown, so that the right head of cylinder 72 is held in abutment with stationary piston 71. The arrangement is such that as the crank 62 rotates, from its broken line position 62' to its full line position in Fig. 10, the bell crank 60, 69 is swung 90° from its broken line position to its full line position, and the loader crank arm 80 is also swung 90° from its broken line to its full line position, thereby bringing a workpiece on arbor 34 from the loading station into alignment with the work spindle. The effect of interposing the bell crank 60, 69 between the pitmans 66 and 75 is to cause the loader arm to slow as it reaches its limit position wherein stops 59 and 61 abut, because at this time pivots 70, 40 and 76 are in approximate alignment. A stop screw 90 on pitman 75 abuts the bell crank at this time. While the loader arm is being swung to this position the slide 26 is held against motion by the biasing means 71, 72. However when the stop means 59, 61 and 90 arrest the motion of the loader arm and the bell crank, the continued rotation of the crank 62 causes the slide to move. Thus, as the crank moves from its full line position to its broken line position 62" in Fig. 10, the pivot 68 remains stationary and the slide is moved to the left against the resistance of the biasing means. This action moves the work spindle, as a unit with the slide, toward the workpiece, i. e. to the right in Figs. 1 and 2. Subsequently, after the heat treating operation, the crank 62 is rotated through another half revolution, from position 62" to position 62'. During the first part of this motion the biasing means 71, 72 act to urge the assembly 65, 62, 66 to the left in Fig. 10 until the right end of cylinder 72 abuts piston 71. Then, during the remainder of the motion of the crank, the loader arm is returned to loading position. When this position is reached an abutment 77 on arm 80 contacts the actuating stem of a two-position limit switch 78, moving the latter from its full line to its dotted line position in Fig. 12.

Figure 3:
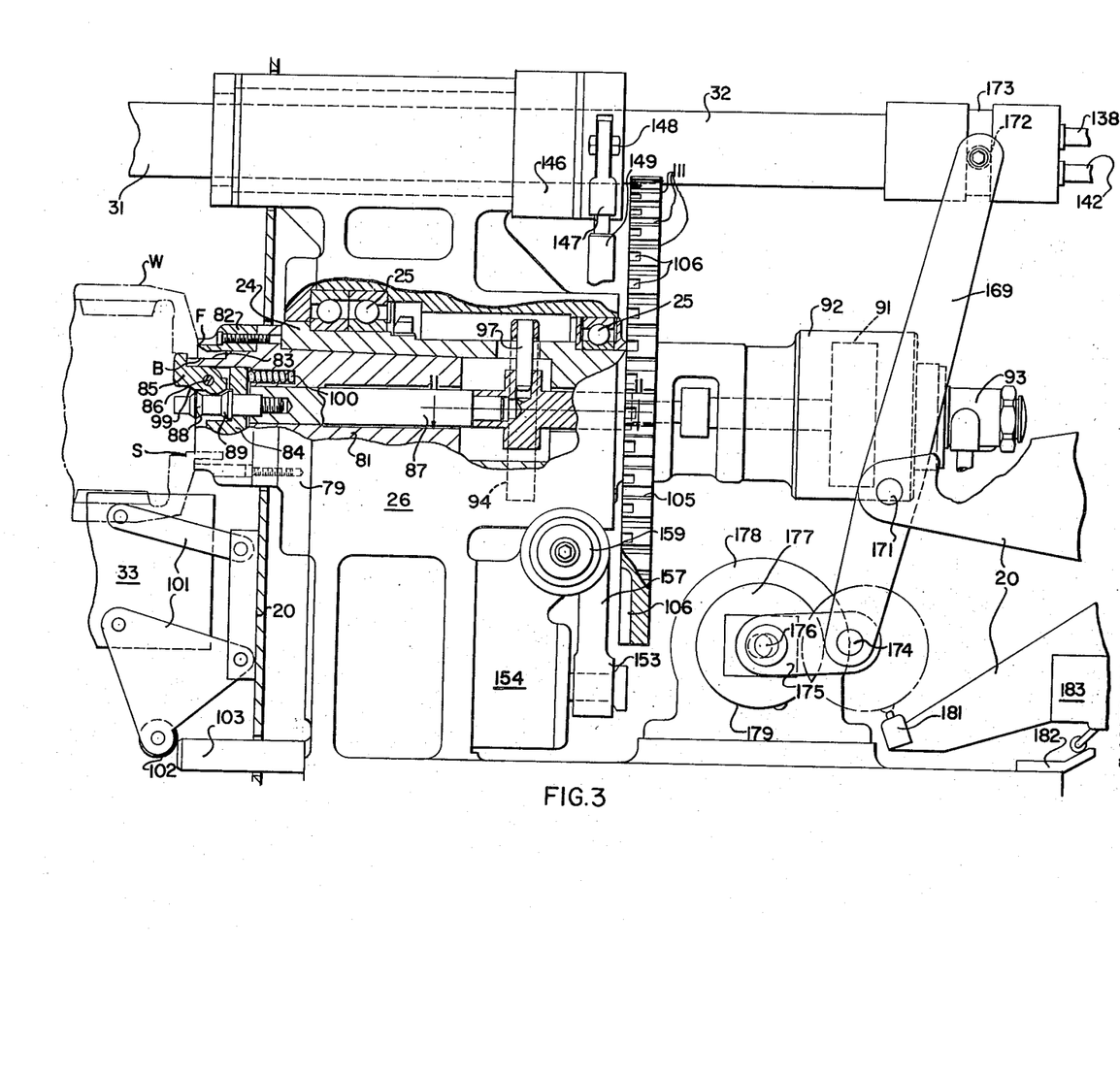
Fig. 3 is a fragmentary side elevation, partly in section, of the slide which supports the work spindle, the view also showing certain adjacent parts of the machine.
Figure 11:
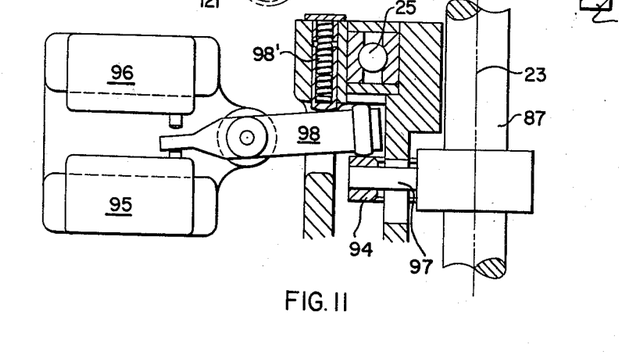
Fig. 11 is a detail sectional view taken in plane 11—11 of Fig. 3.

Secured to the work spindle 24 by screws 79, one of which appears in dotted lines in Fig. 3, is an arbor 81 having a nose piece 82 against which a face F of the workpiece seats. The arbor also has a cylindrical surface 83 for telescoping within bore B of the workpiece. Slidable in a central bore in the arbor is a work support member 84 to which three circumferentially spaced hooks 85 are pivoted on pins 86, one of these hooks appearing in the plane of Fig. 3. Extending through the arbor is a draw rod 87 having at one end a hook actuator having opposed conical surfaces 88 and 89. The draw rod is connected to a piston 91 which is reciprocable in a cylinder 92 supported by the work spindle 24. Air passages into the cylinder chambers on opposite sides of the piston extend through a swivel fitting 93. Surrounding the work spindle 24 is a ring 94 for actuating two normally open limit switches 95 and 96, Figs. 11 and 12, that are mounted on slide 26. The ring is secured to the draw rod 87 by radial arms 97 which extend through slots in the spindle, and it engages a roller on a spring-biased lever 98 that is pivoted to the slide. The arrangement is such that when air pressure is applied to the left face of piston 91 in Fig. 3, moving the draw rod 87 to the right, the actuator surface 88 coacts with cam surface 99 of each hook 85, pivoting the latter outwardly to engage behind shoulder S of the workpiece. During continued motion the actuator abuts and draws hook support 84 to the right, against the resistance of springs 100, thereby clamping surface F of the workpiece against nose piece 82 of the arbor. At the conclusion of this stroke of the draw rod (downwardly in Fig. 11) the ring 94 allows the lever 98 to be moved by its biasing spring 98' to close limit switch 95. Subsequent to a heat treating operation air pressure is applied to the right face of the piston, whereupon the draw rod is moved, upwardly in Fig. 11 and to the left in Fig. 3, to allow the limit switch 95 to open, to also allow springs 100 to shift support 84 forwardly to thereby release the clamping pressure on the workpiece, and then to cause conical surface 89 of the actuator to pivot hooks 85 inwardly, clear of shoulder S. At the conclusion of this dechucking operation the biasing spring of lever 98 causes the latter to close limit switch 96.

As shown in Figs. 2 and 3 the quench tank 33 is pivotally connected to the frame by two pairs of parallel pivoted links 101. The lower link of each pair carries a roller 102 engaged with a stud 103 on the slide 26. Accordingly when the slide moves forwardly, to enter the arbor 81 in the bore B of the workpiece, the studs and links act to swing the tank upwardly to the position shown wherein the liquid it contains partially immerses the workpiece. Upon movement of the slide in the opposite direction the tank lowers by gravity to a position clear of the workpiece. Quenching liquid supply means, described hereinafter, are provided to keep the tank filled with liquid of the desired temperature. Overflow from the tank drains first into a tank formation 104 in the frame and thence to a suitable drain, not shown. If desired, this drain may extend to a refrigerating and return system, so that the same coolant may be used over and over again.

Figure 9:
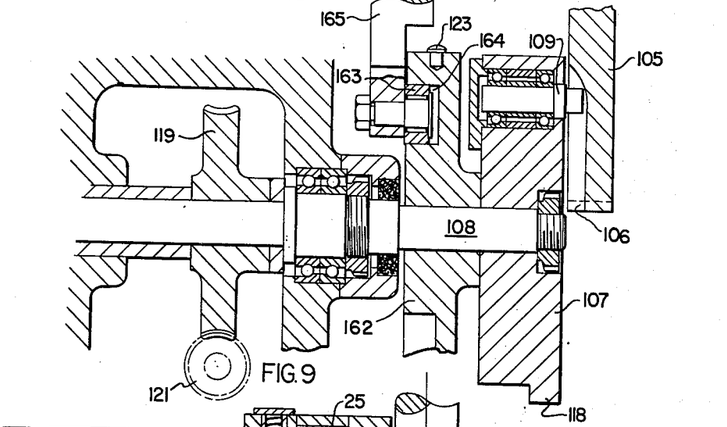
Fig. 9 is a fragmentary sectional view in plane 9—9 of Fig. 8.

For the purpose of indexing the work spindle to bring the teeth T of the workpiece successively into operative relation to burner 28, an index plate 105, Figs. 3, 8 and 9, is secured to the work spindle 24. The plate, which constitutes the driven member of a Geneva movement, has a number of radial slots 106, corresponding to the number of teeth T on the workpiece. The drive member of the Geneva movement comprises a disc 107 affixed on a shaft 108 that is rotatable on slide 26. The disc has a drive pin 109 which on each revolution of the shaft enters one of the slots 106 and thereby drives the plate. In the case illustrated, for a forty-seven tooth work gear, the arrangement is such that the plate is advanced by five slots, i.e., the gear is rotated by five circular pitch of teeth T for each rotation of disc 107.

For holding the work spindle stationary between indexing operations a plurality of tapered notches 111 are provided in the periphery of the index plate, there of course being forty-seven such notches in the illustrated example. Engageable in these notches is a lock dog 112 on one arm of a bell crank 113 which is pivoted to the slide by pin 114. The other arm of the bell crank carries a roller 115 and is also engaged by a spring-backed plunger 116. The latter, supported in a bracket 117 on the slide 26, serves to urge the bell crank in a clockwise direction, in Fig. 8, to retain the lock dog 112 seated in a notch 111. On the periphery of disc 107 is a cam formation 118 engageable with the roller 115 for pivoting the bell crank to thereby lift the lock dog out of the notch. This cam formation is in such phase relation to drive pin 109 that the lock dog is lifted clear of the notch just before the pin enters into driving engagement in a slot 106, and is allowed to seat in another notch 111 just as such driving engagement ends. As shown in Fig. 9, the shaft 108 has keyed thereto a worm wheel 119 with a worm 121 which is driven by a motor 122, the latter having associated therewith a brake device which stops the worm as soon as the motor is deenergized. On the disc 107 is a button 123 engageable with a roller on the actuating arm 124 of a two-position limit switch 125, for momentarily operating it from its normal full line position to its dotted line position in the wiring diagram, Fig. 12.

Figure 6:
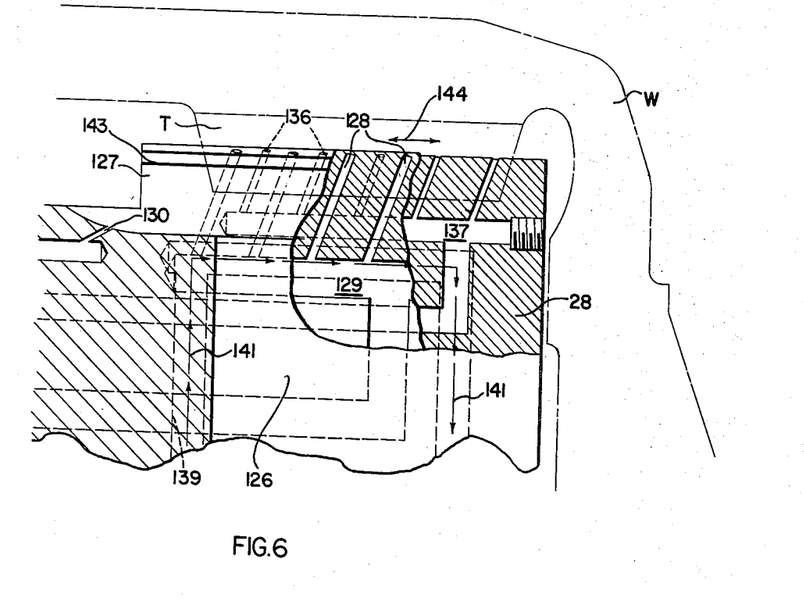
Fig. 6 is a fragmentary plan sectional view of the burner, the major part of the view being in plane 6—6 of Fig. 7.
Figure 7:
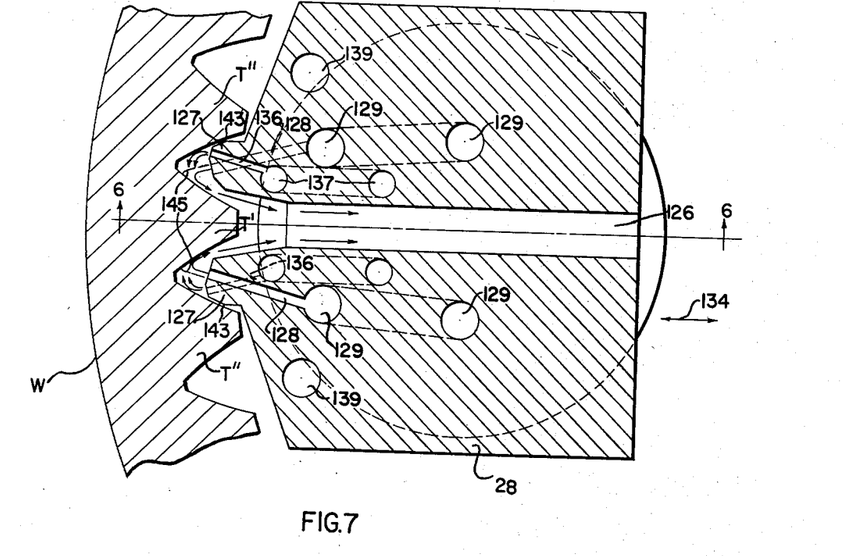
Fig. 7 is a sectional view through the burner, at approximately right angles to the plane of Fig. 6.

The burner 28, shown in detail in Figs. 6 and 7, is preferably made of coopper or other metal of high thermal conductivity. Its tip is bifurcated to provide a flue 126 for spent gases, and each branch has a tongue 127 seating in a tooth space adjacent one side of the tooth that is being heated, designated T' in Fig. 7. Each tongue is slightly longer than the teeth T of the workpiece and has a plurality of openings 128 inclined to direct jets of combustible gas against the adjacent flank of the tooth T'. These openings 128 in each tongue communicate with a feeder passage 129 which leads to a mixing valve 131, Fig. 2, which in turn is connected by flexible conduits 132 and 133 to suitable gas control devices and gas sources. Preferably an oxygen-acetylene gas mixture is employed in the burner, the oxygen being supplied to the mixing valve through conduit 132 and acetylene through conduit 133. These conduits are controlled by solenoid operated valves, not shown, but whose solenoid windings 134 and 135, respectively, appear in Fig. 12.

Figure 12:
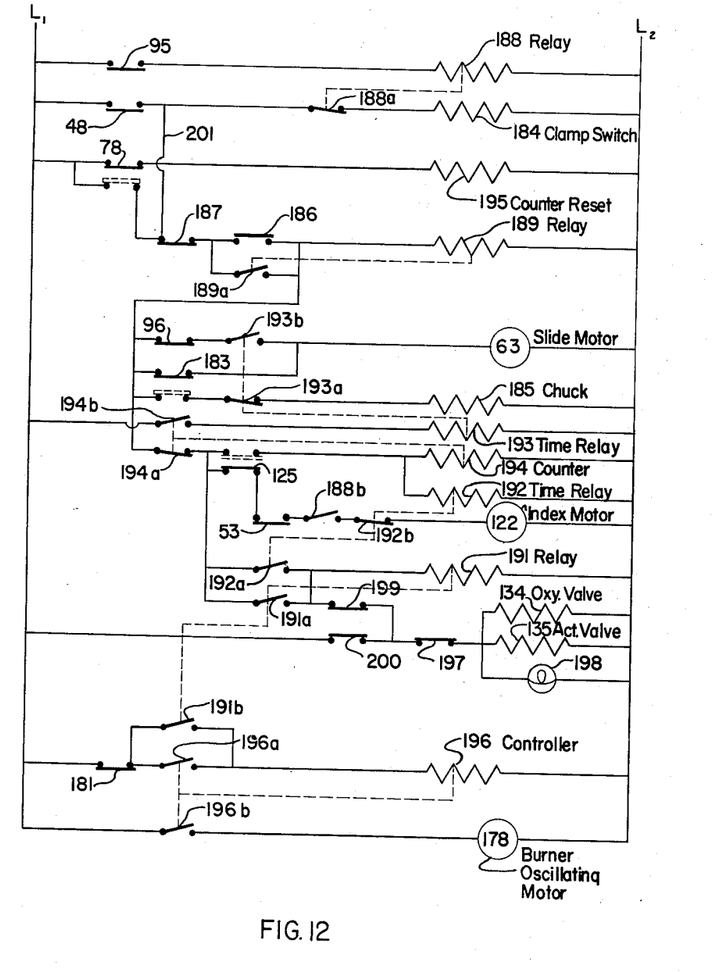
Fig. 12 is a wiring diagram of the machine.

In order to prevent the heating of teeth T", on either side of tooth T', above a temperature which would draw their hardness after they have been heat treated, compressed air is directed against them from openings 136 in each burner tongue. The air is fed to these openings by feeder passages 137 which extend through the burner support 29, including journal part 31, and communicate with a flexible conduit 138, Fig. 3, leading through a suitable rate-of-flow control valve, not shown, to a source of compressed air. The burner tip is cooled by water or other liquid flowing through passages 139, following the course indicated by arrow 141 in Fig. 6. The liquid enters passages 139 from a flexible conduit 142, Fig. 3, and a passage through the support 31, 29, and discharges into tank 33 from which it overflows into tank 104. A valve-controlled, flexible conduit leading from conduit 142 discharges coolant directly into tank 33. The overall rate of flow into the tank is thereby adjustable to maintain the tank temperature at the desired degree.

As shown in Fig. 7 the edge 143 of tongues 127 are as close to teeth T" as possible consistent with the burner being free to oscillate, in the direction of arrow 144, to cause uniform heating of the surface of tooth T'. Accordingly the compressed air, most of which escapes finally through flue 126 together with the products of combustion, provides a protective layer which insulates the hot gases of combustion from the teeth T". The approximate boundary between the hot gases and the protective layer of air is designated at 145 in Fig. 7. Heat is of course conducted through the metal at the flanks of tooth T' toward the root surface thereof, with the result that substantially the entire surface of tooth T' is heated to a substantially uniform temperature high enough that upon subsequent quenching the entire working surface of the tooth flanks is case hardened. Such quenching is effected by the indexing operation, described hereinbefore, which turns the work gear far enough to immerse into quenching liquid in tank 33 the tooth T' that has just been heated.

In addition to protecting the teeth T" from excessive heating it has been found that the air flowing through openings 136 serves to scavenge burned gases from the zone adjacent tooth T', and thereby causes the burning of gases from openings 128 to continue more steadily and realiably than it does in the absence of such air flow. Ignition of the gases from openings 128 is effected by a pilot flame. For this purpose a pilot gas opening 130 is provided in the burner to direct a jet of flame across the jets of gases issuing from openings 128. Opening 130 communicates through suitable passages with a source of combustible gas not shown.

By reason of the projection of burner tongues 127 into the tooth spaces it is necessary to swing the burner in the direction of arrow 134 in Fig. 7 in time with indexing, the burner swinging to the right at the initiation of indexing and to the left at the conclusion of indexing. For this purpose the journal part 31 of the burner support is splined to a sleeve 146 in which it is reciprocable along axis 32, the sleeve being mounted to rock about axis 32 in the upper part of slide 26. Affixed to the sleeve is an arm 147, Fig. 8, pivotally connected by pin 148 to the upper end of a pitman 149 whose lower end is connected by pin 151 to an arm 152. The latter is affixed to a shaft 153 journaled in a bracket 154 on the slide 26. Also affixed to shaft 153 is a pinion 155 that meshes with a rack 156 and an arm 157 which abuts a stop screw 158. The latter is threaded to the bracket 154 and may be turned therein by means of a knurled knob 159. As the rack 156 reciprocates it rocks the pinion 155, shaft 153 and arms 152 and 157, and, through the action of pitman 149 and arm 147, the sleeve 146 and burner support are rocked about axis 32 to move the burner 28 in the direction of arrow 134, Fig. 7, toward and away from the tooth T'. By adjusting the stop screw 158 the limit position of the burner into the tooth spaces adjacent tooth T' can be accurately set to establish a minimum clearance between edges 143 and the flanks of teeth T". After stop screw 158 has been adjusted it may be locked by clamp screw 161.

The rack 156 is reciprocated by a cam 162, Figs. 8 and 9, secured to shaft 108. A roller 163 riding in cam groove 164 of the cam is carried by a rod 165 which is reciprocable in bracket 154 and is held against rotation therein by a key 166. The head of a bolt 167 secured to rod 165 is adapted to abut and move the rack, to the right in Fig. 8, as a unit with the rod; and a spring 168 compressed between the rod and the rack constantly urges the latter against the bolt head. The arrangement is such that just prior to indexing of the work, effected by roller 109 riding in a slot 106 of the index plate 105, the cam 162 acts through roller 163, rod 165 and bolt 167, to move the rack to the right in Fig. 8 to thereby move the burner to the right in Fig. 7 to withdraw tongues 127 from the tooth spaces of the workpiece; and that at the conclusion of the indexing operation the cam acts to move the burner to its limit position shown in Fig. 8 determined by stop means 157, 168. The spring 158 permits the cam 162 to have a throw slightly greater than the stroke of the rack 156 so as to assure abutment of the stop arm 157 against stop screw 158 in any position of adjustment of the latter.

For the purpose of oscillating the burner assembly along axis 32 during the heat treating operation and for shifting it into and out of operative relation with the workpiece at the beginning and end of the machine's operating cycle, the lever 169 shown in Fig. 3 is provided. This lever is fulcrumed to the frame 20 by a pivot pin 171 and at its upper end has a roller 172 engaging in a groove 173 in journal part 31 of the burner arm. At its lower end the lever is pivotally connected by pin 174 to a link 175 which journals an eccentric 176 which is driven through a reduction gear unit 177 by a motor 178, the unit and motor both being mounted on the slide 26.

In operation, with the slide 26 stationary, the eccentric rotated by motor 178 oscillates lever 169 and thereby reciprocates the burner so that the flames from burner openings 128 uniformly heat the flanks of tooth T'. When the slide is reciprocated on the frame, by the means shown in Fig. 10, the lever is also oscillated to move the burner relative both to the frame and to the slide 26. When the slide approaches its limit position to the right in Figs. 1, 2 and 10 (but to the left in Fig. 3), wherein piston 71 abuts the right end wall of cylinder 72, a cam 179, Fig. 3, that is rotatable with eccentric 176 becomes engageable with a normally closed limit switch 181 on the frame. The phase relation of cam 179 to burner oscillation effected by eccentric 176 is such that the cam opens the switch 181 to stop motor 178 with the burner in its most advanced position of oscillation with respect to the frame, i. e. farthest to the left in Fig. 3. To assure this the motor is preferably provided with a brake which stops it almost instantly after it is deenergized. When the slide 26 is in its limit position to the left, as shown in Fig. 3, a stop 182 carried by it engages and closes a two-position limit switch 183 to move this switch from its normal full line position to its dotted line position in Fig. 12.

In addition to the switches and other control devices hereinbefore described, other control devices are also provided and may be connected in the electrical circuit arrangement shown in Fig. 12 across leads $L_1$ and $L_2$ which extend to a suitable source of electrical energy. These control devices include a two-position air valve, not shown, controlled by solenoid 184. When this solenoid is energized the valve applies air under pressure to the left chamber of cylinder 41, Fig. 5, and vents the right chamber of the cylinder to the atmosphere. When solenoid is deenergized the valve reverses this condition. A similar two-position air valve, not shown, is controlled by a solenoid 185 which when energized causes the valve to connect the left chamber of the cylinder 92, in Fig. 3, to air under pressure and to vent the right chamber of the cylinder to the atmosphere. When the solenoid 185 is deenergized the valve reverses, venting the left chamber to the atmosphere and connecting the right chamber to the pressure source. There is also a normally open, push button type, start switch 186; a normally closed stop switch 187, also of the push button type; and a relay comprising winding 188 and contacts 188a and 188b. Contact 188a is closed only when the winding is deenergized and open when it is energized, while the reverse is true of contact 188b. Another relay comprises winding 189 and a contact 189a which is closed only while the winding is energized. Still another relay comprises winding 191 and contacts 191a and 191b both of which are closed only when the winding is energized.

There are also two time relays for determining the length of the heating and quenching phases of the operating cycle. One of these comprises winding 192 and contacts 192a and 192b. Contact 192a closes and opens with no delay when the winding is respectively energized and deenergized, while contact 192b opens immediately on energization but closes with a delay, whose length is adjustable, upon deenergization of the winding. The other time relay comprises winding 193 and contacts 193a and 193b, which respectively open and close immediately upon energization of the winding but reverse these positions with a time lag, which is adjustable, when the winding is deenergized.

There is also an electrically operated counting device which has a counter winding 194, a reset winding 195, a normally closed contact 194a and a normally open contact 194b. Upon a number of energizations of the counter winding 194, which number is adjustable, the contact 194a opens and 194b closes. The contacts then remain in this condition until the device is reset by energization of winding 195, which closes 194a and opens 194b. There is a controller for the burner oscillating motor 178, this controller comprising a winding 196 and contacts 196a and 196b both of which are closed only when winding 196 is energized. There are also a manual switch 197 for controlling the gas valve solenoids 134 and 135 and a lamp 198 which is connected in parallel with them; and a manual switch having contacts 199 and 200 for disconnecting the solenoids 134, 135 from the automatic control system and making them subject only to manual control switch 197.

To operate the machine through its automatic cycle the pilot burner 130 is first lighted and switch contacts 199 and 197 are closed, a workpiece W is placed on the loader arm arbor 34, which closes switch 48, and the start button switch 186 is momentarily closed. Upon closing of switch 48 a circuit is established from $L_1$ to $L_2$ through now closed relay contact 188a and air valve solenoid 184, so that the air valve acts to apply pressure to piston 39, causing it to move to the right (in Fig. 5) with the result that switch 53 closes and the loader arm clamp members 36 grip the workpiece. Closing of start switch 186 energizes relay winding 189 through switch 48, cross connection 201 and switches 187 and 186, with the result that relay contact 189a closes and thereby shunts the start switch which thereafter may be opened without effect. A circuit is also established through contact 189a and switch 183 (which is in its full line position) to operate motor 63. This first swings the loader arm 21 to its transfer position, aligning the workpiece with the work spindle 24, and then moves the slide 26 forwardly, to cause the arbor surface 83 to telescope within the bore B of the workpiece. Simultaneously, due to the action of lever 169, the burner assembly is moved to enter the burner 28 into the workpiece. As soon as the arm 21 swings away from its loading position switch 78 shifts to its dotted line position in the wiring diagram. At the conclusion of the motion of slide 26 the limit switch 183 is shifted by stop 182 to its dotted line position in the wiring diagram, thereby stopping the motor 63, and at the same time establishing a circuit through now closed time relay contact 193a and chuck valve solenoid 185. As a result air pressure is applied to the left chamber of cylinder 92, in Fig. 3, so that the piston 91 operates to chuck the workpiece on arbor 81, in the manner previously described, opens switch 96 and closes switch 95.

As the workpiece is chucked the hooks 85 shift it along the arbor 34 far enough to allow switch 48 to open but this has no effect since switch 78, now in its dotted line position, and connection 201 maintain solenoid 184 energized. Closing of switch 95 energizes relay winding 188 with the result that contact 188b closes and contact 188a opens, the latter deenergizing air valve solenoid 184 and so causing the loader arm piston 39 to be moved to the left, in Fig. 5. This withdraws clamp members 36, freeing the workpiece for rotation with respect to the loader arm, and closes switch 53.

Closing of switch 53 establishes a circuit through now closed relay contact 188b of the counter, index operated switch 125 in its normal position shown in full lines in Fig. 12, switch 53, now closed relay contact 188b, normally closed time relay contact 192b and the index motor 122. As a result this motor is put in operation, causing the work to be indexed (advanced by five teeth) as previously described. At the end of this first indexing cycle the switch 125 is momentarily operated by the button 124 to its dotted line position in the wiring diagram, and then returned to its full line position, thus momentarily energizing winding 194 of the counting device and also the time relay winding 192. The latter immediately closes contact 192a and opens contact 192b. Contact 192a opens only momentarily later when winding 192 is deenergized but contact 192b closes with a substantial delay. Upon the momentary closing of contact 192a the holding relay winding 191 is energized, thereby closing its contact 191a which establishes a shunt around time relay contact 192a so that despite subsequent opening of the latter the winding 191 remains energized. The shunt circuit through contact 191a also closes the circuit through switches 199 and 197 and energizes solenoids 134 and 135, thereby opening the oxygen and acetylene valves, whereupon the burner is lighted by the pilot flame. Signal lamp 198 on the switch panel is also lighted, to warn the operator that the gas is turned on.

Upon the delayed closing of time relay contact 192b the motor 122 operates the index mechanism through another cycle during which the work is indexed by five teeth, to thereby immerse the tooth first heated by the burner into the quench tank 33. The motor stops when button 124 momentarily opens and then recloses switch 125, which causes momentary energization of winding 192 followed by contact 192b remaining open for a time period long enough for quenching the heated tooth now in the quench tank and heating of the tooth now beneath the burner. After the first indexing operation, during which the burner is lighted, the indexing operation is repeated a number of times corresponding to the number of teeth on the workpiece plus one. This causes the last tooth of the workpiece that is heated to be indexed into the quench tank. On each momentary actuation of switch 125 by button 124 the counter winding 194 is energized. When the full count is reached, in this case after a total of forty-eight indexings, the counter opens its contact 194a and closes contact 194b. Opening of 194a deenergizes the relay winding 191 (causing holding contact 191a to open). It also deenergizes the oxygen and acetylene valve solenoids 134 and 135 (extinguishing the burner), and the lamp 198. Closing of counter contact 194b energizes time relay 193, which, after a time delay long enough to allow quenching of the last heated tooth, opens its contact 193a and closes its contact 193b. The opening of contact 193a deenergizes air valve solenoid 185 so that air pressure is applied to the right chamber of cylinder 92, moving piston 91 to the left in Fig. 3. This dechucks the work from the work spindle, opens switch 95 and closes switch 96, Fig. 11. The hooks 85 move to a position clear of the workpiece, but the latter is not shifted on arbor 34 to close switch 48.

Opening of switch 95 deenergizes relay winding 188 with the result that its contact 188a closes. Although switch 48 remains open, switch 78 is in its full line position, Fig. 12, and hence when contact 188a is closed the air valve solenoid 184 is energized and operates to apply air pressure to the left end of cylinder 41, in Fig. 5, causing piston 39 to move clamps 36 to grip the workpiece and open switch 53.

As soon as switch 96 closes, a circuit is established through now closed contact 193b and the controller for slide motor 63. This motor operates crank 62, Fig. 10, through one-half turn, from position 62" to position 62', thereby first moving the slide 26 rearwardly to withdraw arbor 81 from the bore of the workpiece, and moving the burner forwardly out of the workpiece, and then swinging the loader arm 21, now carrying the workpiece, back to the loading station.

As the slide 26 approaches its rearward position the cam 179, rotated by the burner oscillating motor 178, engages and opens switch 181 at least momentarily with the result that contact 196a of the oscillating motor's controller is operated when the burner is in a forward point in its oscillation. Since contact 191b is now open the circuit through controller winding 196 is broken and the oscillating motor 178 is stopped. When the loader arm reaches the unloading station, switch 78 is returned to its full line position in the wiring diagram, thereby breaking the circuit through relay winding 189 and also the circuit through air valve solenoid 184. Opening of the circuit through winding 189 causes relay contact 189a to open, breaking the circuit to the controller for motor 63 so that the latter stops. At the same time switch 78 is closed to establish a circuit through winding 195 of the counter, resetting the latter for a new sequence of counting operations. The deenergization of the solenoid 184 causes the air valve to reverse, whereupon the piston 39 retracts the loader clamps 36 and opens the switch 53. The operator may now remove the workpiece from the arbor 34 and the machine then stands ready for another operating cycle on the next workpiece.

It will be understood that the foregoing description of the preferred machine and method has been made by way of example and not by way of limitation, and that various changes and modifications may be made therein without departing from the spirit of our invention or from the scope of the appended claims.

What we claim is:

1. The method of heat treating a toothed workpiece which comprises heating an entire tooth thereof by directing gas flames against opposite flanks of the tooth simultaneously throughout substantially the entire length of the tooth, and simultaneously directing a coolant gas against the adjacent flanks of adjacent teeth throughout substantially the entire length of said teeth.

2. The method of claim 1 in which the workpiece is partially immersed in a quenching liquid and is periodically rotated to thereby immerse the tooth which has just been heated by the gas flame and simultaneously bring another tooth into position for such heating.

3. The method of heat treating a toothed workpiece which comprises heating an entire tooth thereof by directing gas flames against opposite flanks of the tooth simultaneously throughout substantially the entire length of the tooth and simultaneously directing a curtain of gas into each of the tooth spaces entered by said flames to protect the adjacent teeth from such flames.

4. The method of claim 3 in which the tooth after being heated is subjected to a quenching medium.

5. Surface hardening apparatus for gears and like toothed workpieces comprising a burner having a pair of tongues adapted to enter the tooth spaces on opposite sides of a workpiece tooth to be heated, each tongue having a series of openings therein for directing a combustible gas against the opposite sides of said tooth for simultaneously heating substantially the entirety of said sides, and said tongues having other openings for directing a coolant gas against the sides of the tooth spaces opposite to the tooth sides being heated.

6. Apparatus according to claim 5 in which said tongues are proportioned and spaced from each other to provide a space extending along the length of the tooth being heated through which the burned gas and coolant gas may exhaust, and to so closely approach the said sides of the tooth spaces opposite to those being heated as to susbtantially prevent the exhaust of burned gas along said sides.

7. Apparatus according to claim 6 in which the burner has extending therethrough a flue for exhausting burned gas and coolant gas, said flue opening into the space between said tongues.

8. Surface hardening apparatus for gears and like toothed workpieces comprising a burner having passages therethrough for coolant fluid and having a pair of spaced tongues providing therebetween a gas exhaust passage, said tongues being so spaced and proportioned as to be able to enter into adjacent tooth spaces of a workpiece in spaced relation to the sides of the tooth between the tongues, to thereby provide gas passages between the tongues and said sides of the tooth which passages open into said gas exhaust passage, while closely approaching the opposite sides of the tooth spaces to prevent substantial gas flow outwardly along said opposite sides, each tongue having another series of openings therein for directing a combustible gas against the adjacent side of said tooth, and each tongue having another series of openings therein for directing a coolant gas against the adjacent one of said opposite sides.

9. A surface hardening machine for gears and like toothed workpieces comprising a frame, a work spindle journaled for tooth-by-tooth rotation upon a frame, a container for quench liquid for partially immersing a workpiece on the spindle, means supported by the frame for directing jets of flame against opposite flanks of the same workpiece tooth, and means supported by the frame for directing coolant gas upon the adjacent flanks of the two teeth adjacent the tooth being heated.

10. A surface hardening machine for gears and like toothed workpieces comprising a frame, a work spindle journaled for rotation upon the frame, a container for quench liquid for partially immersing a workpiece on the spindle, heating means supported by the frame and comprising means to direct jets of flame against opposite flanks of the same workpiece tooth, cooling means supported by the frame and comprising means for directing jets of coolant gas upon the adjacent flanks of the two teeth adjacent the tooth being heated, and means for periodically indexing the work spindle to thereby immerse the heated tooth in said quench liquid and simultaneously bring another tooth of the workpiece into position for heating.

11. A surface hardening machine for gears and like toothed workpieces comprising a frame, a work spindle journaled for rotation upon the frame, a container for quenching liquid for partially immersing a workpiece on the spindle, a burner support movable on the frame, a burner on the support that is arranged to extend into adjacent tooth spaces of the workpiece above the level of said liquid for directing flame against opposite flanks of the tooth between said tooth spaces, the burner having passages for directing coolant gas against the tooth flanks on the opposite sides of said tooth spaces from the flanks being heated, and means for periodically moving the burner support to withdraw the burner from said tooth spaces and for indexing the work spindle to thereby immerse the heated tooth in said quenching liquid and simultaneously bring another tooth into position for heating.

12. A surface hardening machine or the like comprising a frame, a slide on the frame, a work spindle on the slide, a quench tank supported on the frame for movement between an idle position and a work position, a burner support mounted on the slide for oscillation about an axis extending in the direction of slide motion and also for reciprocation along said axis, means for simultaneously reciprocating the slide and the burner support in opposite directions relative to the frame and moving said quench tank, and means for periodically indexing the work spindle and in time therewith oscillating the burner support about said axis.

13. A surface hardening machine or the like comprising a frame, a slide on the frame, a work support on the slide, a quench tank supported on the frame for movement between an idle position and a work position wherein liquid in the tank partially immerses a workpiece on the spindle, a work loading arm pivoted to the frame, means for pivoting the arm to and from a position wherein a workpiece on the arm is aligned with the work support and for moving the slide and quench tank in sequence with such pivoting.

14. A surface hardening machine or the like comprising a frame, a slide on the frame having a work support thereon, a burner support reciprocable on the slide in the direction of slide motion, a lever fulcrumed on the frame and having a pivotal connection to each of the slide and the burner support, means for reciprocating the slide on the frame and thereby reciprocating the burner support on the slide.

15. A surface hardening machine or the like according to claim 14 in which the connection between the lever and the slide comprises a crank, and there is a means to rotate the crank and thereby reciprocate the burner support on the slide.

16. A surface hardening machine or the like according to claim 14 in which there is a work loading arm pivoted to the frame for movement to and from a position wherein a workpiece thereon is aligned with the work support, and the means for reciprocating the slide comprises a crank rotatable thereon and a connecting rod connecting the crank to the loading arm.

17. A surface hardening machine or the like comprising a frame, a slide on the frame having a work support thereon, a work loading arm pivoted to the frame, a burner support reciprocable on the slide in the direction of slide motion, means for pivoting the arm to and from a position wherein a workpiece thereon is aligned with the work support and for moving the slide and reciprocating the burner support in sequence with such pivoting.

18. A surface hardening machine or the like comprising a frame, a slide on the frame, a work spindle journaled in the slide, a work loading arm pivoted to the frame, a burner support on the slide reciprocable on the slide in the direction of slide motion, a quench tank supported on the frame for movement between working and idle positions, means for pivoting the arm to and from a position wherein a workpiece thereon is aligned with the work spindle and for moving the slide and reciprocating the burner support and moving the quench tank in sequence with such pivoting.

19. A surface hardening machine or the like comprising a frame, a slide on the frame, a work spindle journaled in the slide, a work loading arm pivoted to the frame, a burner support mounted on the slide for oscillation about an axis extending in the direction of slide motion and also for reciprocation along said axis, a quench tank supported on the frame for movement between work and idle positions, means for pivoting the arm to and from a position wherein a workpiece thereon is aligned with the work spindle and for moving the slide and reciprocating the burner support and moving the quench tank in sequence with such pivoting, and means for periodically indexing the work spindle and oscillating the burner support in sequence with such indexing.

20. A surface hardening machine or the like comprising a frame, a slide member movable on the frame, a support member movable angularly on the frame, a crank and means for rotating the same mounted on the slide member, a bell crank fulcrumed on the frame, a first pitman connecting the crank to one arm of the bell crank, a second pitman connecting the other arm of the bell crank to the support member, and biasing means for urging one of said members to one limit position thereof on the frame, whereby upon rotation of said crank and slide member and the support member will be respectively reciprocated and oscillated on the frame in sequence.

21. A surface hardening machine or the like comprising a frame, a slide member on the frame having a work support thereon, a burner support reciprocable on the slide member in the direction of motion of the slide member on the frame, a lever fulcrumed on the frame and having a pivotal connection to each of the slide member and the burner support, a work loading arm member pivoted to the frame for movement to and from a position wherein a workpiece thereon is aligned with the work support, a crank rotatable on the slide member, a connecting rod connecting the crank to the loading arm member, and a biasing means for urging motion in one direction of one of said members, whereby upon each half revolution of the crank said members are moved in sequence.

References Cited in the file of this patent

UNITED STATES PATENTS

| | | |
|---|---|---|
| 2,067,549 | Sykes | Jan. 12, 1937 |
| 2,275,402 | Crowe | Mar. 3, 1942 |
| 2,312,839 | Kullman et al. | Mar. 2, 1943 |
| 2,461,734 | Hartley et al. | Feb. 15, 1949 |
| 2,524,044 | Denneen et al. | Oct. 3, 1950 |

FOREIGN PATENTS

| | | |
|---|---|---|
| 546,337 | Germany | Mar. 11, 1932 |